(12) United States Patent
Choi et al.

(10) Patent No.: US 12,381,273 B2
(45) Date of Patent: Aug. 5, 2025

(54) BATTERY MODULE COMPRISING COOLING MEMBER, BATTERY PACK COMPRISING SAME BATTERY MODULE, AND ELECTRONIC DEVICE

(71) Applicant: LG ENERGY SOLUTION, LTD., Seoul (KR)

(72) Inventors: Bum Choi, Daejeon (KR); Jong-Yoon Keum, Daejeon (KR); Dong-Hwan Shin, Daejeon (KR); Jong-Chul Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 17/789,499

(22) PCT Filed: May 14, 2021

(86) PCT No.: PCT/KR2021/006106
§ 371 (c)(1),
(2) Date: Jun. 27, 2022

(87) PCT Pub. No.: WO2021/235784
PCT Pub. Date: Nov. 25, 2021

(65) Prior Publication Data
US 2023/0040680 A1    Feb. 9, 2023

(30) Foreign Application Priority Data

May 22, 2020 (KR) .................... 10-2020-0061863

(51) Int. Cl.
*H01M 10/613* (2014.01)
*H01M 10/643* (2014.01)
(Continued)

(52) U.S. Cl.
CPC ..... *H01M 10/6556* (2015.04); *H01M 10/613* (2015.04); *H01M 10/643* (2015.04); *H01M 10/6554* (2015.04)

(58) Field of Classification Search
CPC ........... H01M 10/6556; H01M 10/613; H01M 10/643; H01M 10/6554
See application file for complete search history.

(56) References Cited

U.S. PATENT DOCUMENTS

2011/0086245 A1   4/2011  Park et al.
2011/0097617 A1   4/2011  Gu et al.
(Continued)

FOREIGN PATENT DOCUMENTS

CN   103201870 A   7/2013
CN   103296330 A   9/2013
(Continued)

OTHER PUBLICATIONS

Office Action issued in corresponding Japanese Patent Application No. 2022-527218, dated Jun. 12, 2023.
(Continued)

*Primary Examiner* — Olatunji A Godo
(74) *Attorney, Agent, or Firm* — Morgan, Lewis & Bockius LLP

(57) ABSTRACT

Disclosed is a battery module with improved manufacturing efficiency and improved cooling efficiency. The battery module includes a plurality of secondary batteries; and a cooling member configured so that the plurality of secondary batteries are mounted thereto, and the cooling member includes an upper frame having a plate shape with a predetermined length so that the plurality of secondary batteries are mounted to a first surface thereof; and a lower frame coupled to a second surface of the upper frame on a side opposite the first surface and having a coolant channel
(Continued)

configured so that a coolant flows through the coolant channel.

9 Claims, 6 Drawing Sheets

(51) Int. Cl.
  *H01M 10/6554* (2014.01)
  *H01M 10/6556* (2014.01)

(56) References Cited

U.S. PATENT DOCUMENTS

| | | | |
|---|---|---|---|
| 2012/0107663 A1 | 5/2012 | Burgers et al. | |
| 2012/0312614 A1 | 12/2012 | Fujiwara et al. | |
| 2015/0079442 A1 | 3/2015 | Haussmann | |
| 2015/0236385 A1 | 8/2015 | Park et al. | |
| 2016/0049705 A1 | 2/2016 | Mahe et al. | |
| 2016/0111691 A1 | 4/2016 | Garascia et al. | |
| 2016/0164148 A1 | 6/2016 | Yum et al. | |
| 2017/0244143 A1 | 8/2017 | Burgers et al. | |
| 2017/0263987 A1 | 9/2017 | Kopp et al. | |
| 2017/0288285 A1 | 10/2017 | Buckhout et al. | |
| 2018/0198154 A1 | 7/2018 | Lee et al. | |
| 2018/0287227 A1 | 10/2018 | Jeong et al. | |
| 2019/0229384 A1 | 7/2019 | Tasiopoulos et al. | |
| 2020/0185795 A1* | 6/2020 | Park | H01M 10/6552 |

FOREIGN PATENT DOCUMENTS

| | | |
|---|---|---|
| CN | 207602744 U | 7/2018 |
| CN | 109921144 A | 6/2019 |
| CN | 110061329 A | 7/2019 |
| DE | 10-2008-059967 A1 | 6/2010 |
| DE | 10-2010-013025 A1 | 9/2011 |
| DE | 10-2012-012663 A1 | 12/2013 |
| DE | 10-2015-222775 A1 | 5/2017 |
| JP | H09-17927 A1 | 1/1997 |
| JP | 2012-094370 A | 5/2012 |
| JP | 2012-256468 A | 12/2012 |
| JP | 2013-543239 A | 11/2013 |
| JP | 2016-524114 A | 8/2016 |
| JP | 2017-520883 A | 7/2017 |
| KR | 10-2014-0100605 A | 8/2014 |
| KR | 10-2015-0096885 A | 8/2015 |
| KR | 10-1589931 B1 | 1/2016 |
| KR | 10-1781923 B1 | 9/2017 |
| KR | 10-1806447 B1 | 1/2018 |
| KR | 10-2018-0054064 A | 5/2018 |
| KR | 10-2018-0110969 A | 10/2018 |
| KR | 10-1965373 B1 | 4/2019 |
| KR | 10-2019-0089121 A | 7/2019 |
| KR | 10-2020-0025719 A | 3/2020 |

OTHER PUBLICATIONS

International Search Report (with partial translation) and Written Opinion dated Sep. 1, 2021, for corresponding International Patent Application No. PCT/KR2021/006106.

Office Action issued in corresponding Taiwanese Patent Application No. 110118258, dated Oct. 14, 2024.

Extended European Search Report issued in corresponding European Patent Application No. 21807741.0, dated Jun. 18, 2023. Note: US 2017/0263987 cited therein is already of record.

Office Action issued in corresponding Chinese Patent Application No. 202180006926.X, dated Feb. 28, 2025. (Note: US 2015/0079442 A1 was previously cited.).

* cited by examiner

BATTERY MODULE COMPRISING COOLING MEMBER, BATTERY PACK COMPRISING SAME BATTERY MODULE, AND ELECTRONIC DEVICE

The present application claims priority to Korean Patent Application No. 10-2020-0061863 filed on May 22, 2020 in the Republic of Korea, the disclosures of which are incorporated herein by reference.

TECHNICAL FIELD

The present disclosure relates to a battery module including a cooling member, a battery pack including the battery module, and an electrical device, and more particularly, to a battery module with improved manufacturing efficiency and improved cooling efficiency.

BACKGROUND ART

Recently, as the demand for portable electronic products such as laptops, video cameras and portable telephones has rapidly increased and the development of electric vehicles, energy storage batteries, robots, satellites, and the like is being performed in earnest, a high-performance secondary battery capable of repetitive charging and discharging is being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, hermetically containing the electrode assembly together with an electrolyte.

In addition, the lithium secondary battery may be classified into a can-type secondary battery in which an electrode assembly is embedded in a metal can and a pouch-type secondary battery in which an electrode assembly is embedded in a pouch made of an aluminum laminate sheet, depending on the shape of its exterior.

Here, a metal can of the can-type secondary battery in which the electrode assembly is embedded may be manufactured in a cylindrical shape. The can-type secondary battery may be used to configure a battery module, which includes a module case for accommodating a plurality of secondary batteries and a bus bar configured to electrically connect the plurality of secondary batteries.

In addition, the conventional battery module includes a heatsink to discharge heat generated from the module case including a plurality of secondary batteries to the outside. In particular, in the conventional art, a cooling plate for heat conduction is generally interposed between the module case and a heatsink.

However, the cooling plate interposed between the module case and the heatsink may lengthen a heat transfer path and reduce the heat conduction efficiency. Moreover, if the cooling plate is welded to the module case and the heatsink, respectively, components are likely to thermally deform. Also, a plurality of members should be welded to each other, there is a problem of lowering the manufacturing process efficiency.

DISCLOSURE

Technical Problem

The present disclosure is designed to solve the problems of the related art, and therefore the present disclosure is directed to providing a battery module with improved manufacturing efficiency and improved cooling efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
 a plurality of secondary batteries; and
 a cooling member configured so that the plurality of secondary batteries are mounted thereto,
 wherein the cooling member includes:
 an upper frame having a plate shape with a predetermined length so that the plurality of secondary batteries are mounted to one surface thereof; and
 a lower frame coupled to the other surface of the upper frame and having a coolant channel configured so that a coolant flows therethrough.

Also, the coolant channel of the lower frame may have an uneven structure with a portion protruding toward the upper frame, and
 the portion of the uneven structure protruding toward the upper frame may be bonded to the other surface of the upper frame.

Moreover, both side portions of the upper frame and the lower frame may be welded to each other.

In addition, both side portions of the upper frame and the lower frame may be coupled to each other by mechanical joining.

Also, the cooling member may further include sidewalls respectively provided at both side ends of the upper frame to extend upward from both side ends of the upper frame.

Moreover, the cooling member may further include a clip member configured to fix both side ends of the upper frame and the lower frame to each other.

In addition, the clip member may include:
 a body portion configured to elongate along one surface of the upper frame and provided in close contact with the upper frame; and
 a fixing portion bent from the body portion to surround both ends of the upper frame and the lower frame.

Also, the upper frame may include a guide protrusion protruding toward the secondary battery from an upper surface of the upper frame to guide mounting locations of the plurality of secondary batteries.

In addition, in another aspect of the present disclosure, there is also provided a battery pack, comprising at least one battery module described above.

Also, in further another aspect of the present disclosure, there is also provided an electrical device, comprising the battery pack described above.

Advantageous Effects

According to an embodiment of the present disclosure, since the cooling member is coupled to the upper frame and the upper frame to which the plurality of secondary batteries are mounted and the coolant channel is provided to the lower frame, the plurality of secondary batteries may directly contact the upper surface of the cooling member without any additional heat conductive member interposed therebetween, thereby improving the cooling efficiency.

Moreover, according to another embodiment of the present disclosure, since the lower frame of the cooling member is configured to be bonded to the other surface of the upper frame, the cooling member may be assembled without a separate fastening member. Accordingly, in the present disclosure, it is possible to reduce the number of parts and shorten the manufacturing time, compared to the conventional art, thereby reducing the manufacturing cost.

In addition, according to another embodiment of the present disclosure, since both side portions of the upper frame and the lower frame are welded to each other, the bonding strength between the upper frame and the lower frame may be further increased. Accordingly, in the present disclosure, when an external shock occurs while the battery module is in use, it is possible to further prevent the coolant from leaking through the gap between the upper frame and the lower frame due to a crack generated at the cooling member.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
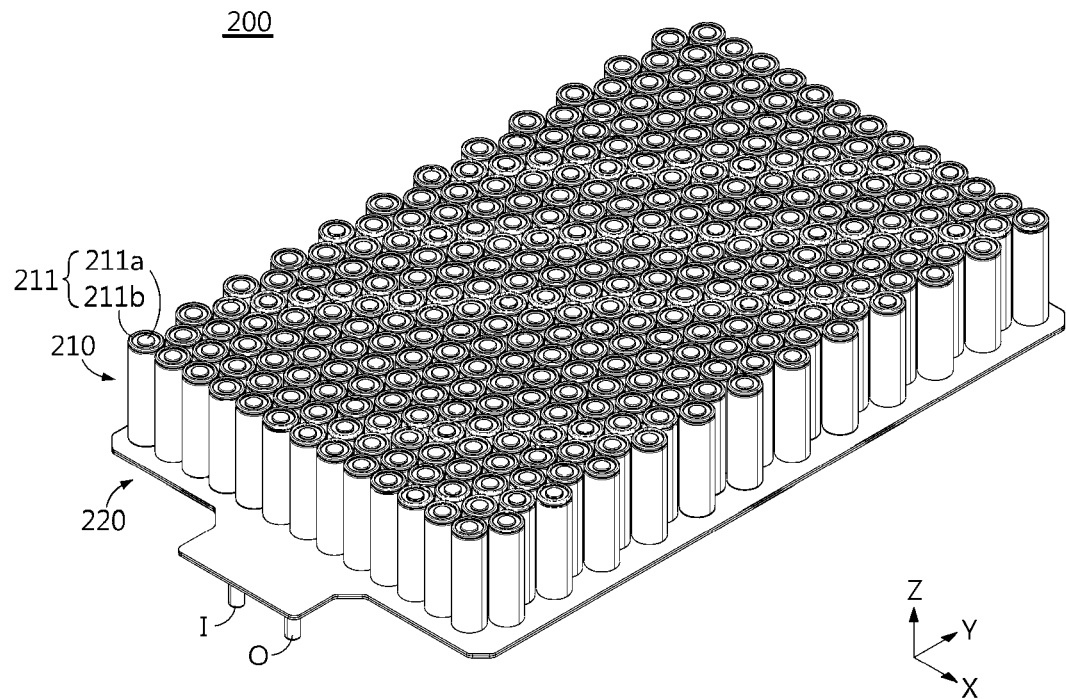
FIG. 1 is a perspective view schematically showing a battery module according to an embodiment of the present disclosure.
Figure 2:
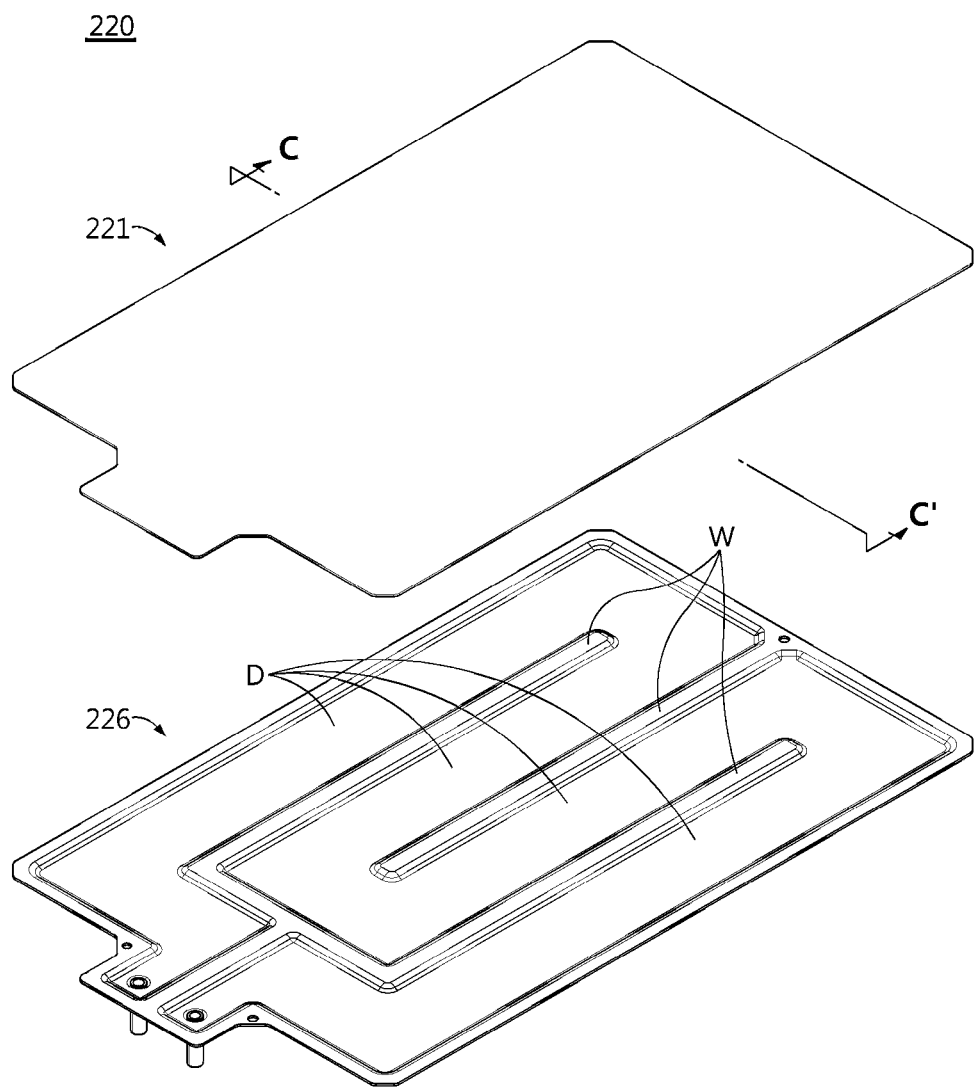
FIG. 2 is an exploded perspective view schematically showing components of the battery module according to an embodiment of the present disclosure.

FIG. 1 is a perspective view schematically showing a battery module according to an embodiment of the present disclosure. Also, FIG. 2 is an exploded perspective view schematically showing components of the battery module according to an embodiment of the present disclosure. For reference, the X-axis shown in FIG. 1 refers to a right and left direction, the Y-axis refers to a front and rear direction, and the Z-axis refers to an upper and lower direction.

Referring to FIGS. 1 and 2, a battery module 200 according to an embodiment of the present disclosure may include a plurality of secondary batteries 210 and a cooling member 220.

Here, the secondary battery 210 may be a cylindrical battery cell. In the cylindrical battery cell, a negative electrode terminal 211b may be formed at an upper portion (an upper corner portion) of a battery can. The cylindrical battery cell may have a battery cap provided at an upper portion thereof, and a positive electrode terminal 211a may be formed at the center of the battery cap. The battery can may include an electrode assembly (not shown) accommodated therein. The battery can and the battery cap may be electrically insulated from each other. Since the configuration of the cylindrical battery cell is widely known to those skilled in the art at the time of filing of this application, it will not be described in more detail in this specification.

Moreover, the plurality of secondary batteries 210 may be disposed to be spaced apart from each other by a distance of 3 mm, for example. In addition, a plurality of secondary batteries 210 located in one row and a plurality of secondary batteries 210 located in another row may be arranged to be positioned differently in a front and rear direction (X-axis direction). In addition, the plurality of secondary batteries 210 located in one row and the plurality of secondary batteries 210 located in another row may be arranged to be positioned differently in a left and right direction. That is, the plurality of secondary batteries 210 may be regarded as being arranged in a zigzag pattern in front, rear, left and right directions as a whole.

In addition, the plurality of secondary batteries 210 may be electrically connected in series or in parallel by a bus bar (not shown) having a conductive metal. The bus bar may include, for example, at least one of copper, nickel and aluminum. For example, the bus bar may be in the form of a wire. The bus bar may electrically connect the positive electrode terminals 211a located on the battery cap at the upper portion of the secondary battery 210 (a positive direction of the Z-axis in FIG. 1) and/or negative electrode terminals 211b formed on the battery can to each other.

Meanwhile, referring to FIGS. 1 and 2 again, the cooling member 220 may include an upper frame 221 and a lower frame 226. Specifically, the upper frame 221 may have a plate shape with a predetermined length so that the plurality of secondary batteries 210 may be mounted to one surface (an upper surface) thereof.

In addition, the lower frame 226 may have an upper portion corresponding to the plane size of the upper frame 221. The lower frame 226 may be coupled to the other surface of the upper frame 221. The lower frame 226 may include a coolant channel D configured so that a coolant flows therethrough.

Specifically, the cooling member 220 may have an inlet I and an outlet O. The inlet I may be configured to inject a cooled coolant from an external device. The outlet O may be configured such that a coolant absorbing heat from the plurality of secondary batteries 210 is discharged toward the external device. The coolant channel D may be connected to the inlet I and the outlet O, respectively.

That is, one end of the coolant channel D may communicate with the inlet I. The other end of the coolant channel D may communicate with the outlet O. The coolant channel D may include a moving path configured to protrude relatively downward to form an empty space through which the coolant may flow, and a barrier W configured to protrude upward to partition the moving path. Here, the coolant may be water, for example.

Therefore, according to this configuration of the present disclosure, since the cooling member 220 is coupled to the upper frame 221 and the upper frame 221 to which the plurality of secondary batteries 210 are mounted and the coolant channel is provided to the lower frame 226, the plurality of secondary batteries 210 may directly contact the upper surface of the cooling member 220 without any additional heat conductive member interposed therebetween, thereby improving the cooling efficiency.

In addition, the upper frame 221 may be manufactured by a pressing method so as not to be susceptible to thermal deformation caused by welding or the like. For example, the upper frame 221 may be made of a metal material such as steel, aluminum and stainless steel. That is, since the upper frame 221 is manufactured by a pressing method, thermal deformation may not be severely generated. Accordingly, in the present disclosure, it is possible to prevent the contact area of the plurality of secondary batteries 210 in contact with one surface of the upper frame 221 from being reduced, since thermal deformation of the upper frame 221 is less generated by the heat generated by charging and discharging of the battery module 200.

Moreover, the lower frame 226 may be manufactured by an injection method. The lower frame 226 may be made of a plastic material. The plastic material may be, for example, an engineering plastic. Since some components of the cooling structure is made of plastic that a lightweight material, it is possible to reduce the weight of the battery module 200.

Figure 3:
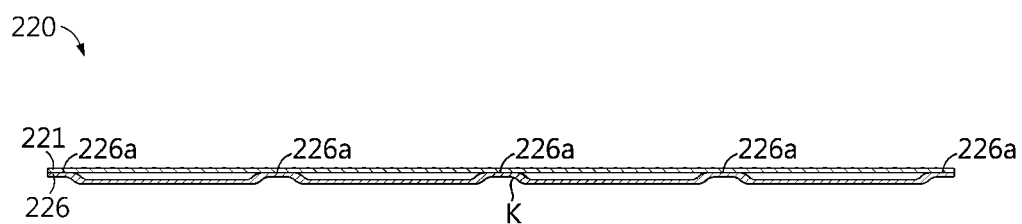
FIG. 3 is a vertical sectional view schematically showing the battery module, taken along the line C-C' of FIG. 2.

FIG. 3 is a vertical sectional view schematically showing the battery module, taken along the line C-C' of FIG. 2.

Referring FIG. 3 along with FIGS. 1 and 2, the coolant channel D of the lower frame 226 may have an uneven structure K with a portion 226a protruding toward the upper frame 221 in cross section. Here, the portion 226a protruding toward the upper frame 221 may be an upper surface of each of the barrier W of the lower frame 226 and the outer peripheral portion of the lower frame 226.

More specifically, the portion 226a of the uneven structure K protruding toward the upper frame 221 may be configured to be bonded to the other surface (a lower surface) of the upper frame 221. At this time, the bonding may be performed using an adhesive. The adhesive is not limited to a specific material and, for example, the adhesive may be a glue or a hot-melt resin. For example, the adhesive may include at least one of a polyamide resin, a polyimide resin, an epoxy resin, and an acrylic resin.

Therefore, according to this configuration of the present disclosure, since the lower frame 226 of the cooling member 220 is configured to be bonded to the other surface of the upper frame 221, the cooling member 220 may be assembled without a separate fastening member. Accordingly, in the present disclosure, it is possible to reduce the number of parts and shorten the manufacturing time, compared to the conventional art, thereby reducing the manufacturing cost.

Figure 4:
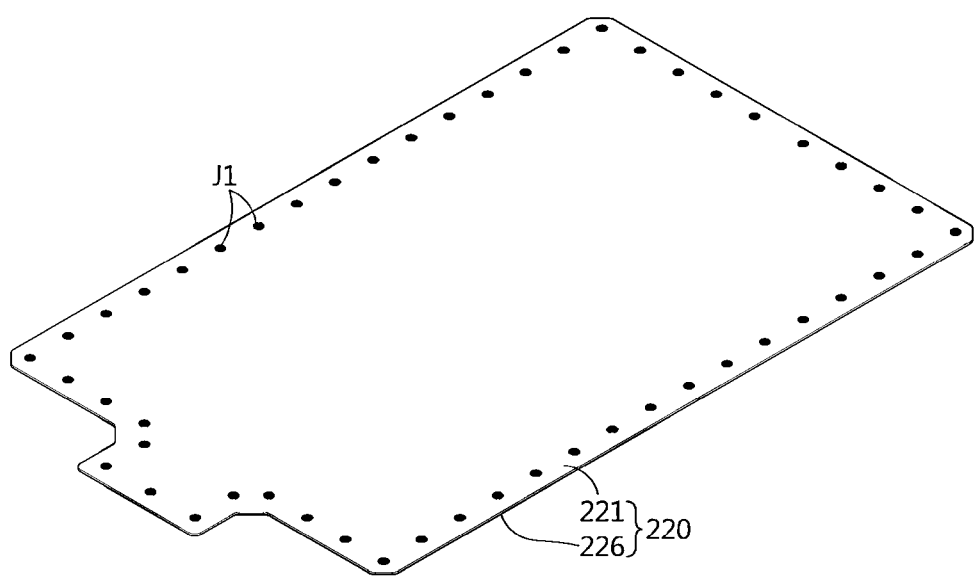
FIG. 4 is a perspective view schematically showing some components of a battery module according to another embodiment of the present disclosure.

FIG. 4 is a perspective view schematically showing some components of a battery module according to another embodiment of the present disclosure.

Referring to FIG. 4, unlike the cooling member 220 of FIG. 3 in which the upper frame 221 and the lower frame 226 are coupled using only an adhesive, the cooling member 220 of FIG. 4 may have a portion in which the upper frame 221 and the lower frame 226 are coupled (joined) by welding.

For example, as shown in FIG. 4, the cooling member 220 of FIG. 4 may have a portion J1 in which both side portions of the upper frame 221 and the lower frame 226 are joined to each other by at least one of spot welding, arc welding and laser welding. However, it is not limited to welding methods, and any known applicable welding method may be used.

Therefore, according to this configuration of the present disclosure, since both side portions of the upper frame 221 and the lower frame 226 are welded to each other, the bonding strength between the upper frame 221 and the lower frame 226 may be further increased. Accordingly, in the present disclosure, when an external shock occurs while the battery module 200 is in use, it is possible to further prevent the coolant from leaking through the gap between the upper frame 221 and the lower frame 226 due to a crack generated at the cooling member 220.

Figure 5:
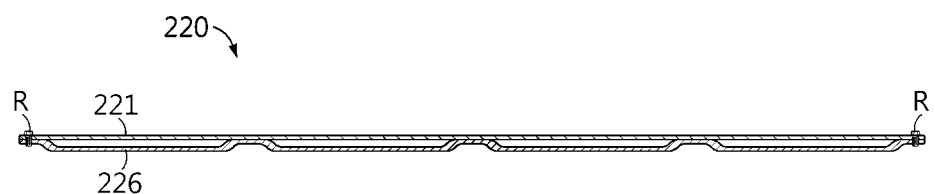
FIG. 5 is a vertical sectional view schematically showing some components of a battery module according to still another embodiment of the present disclosure.

FIG. 5 is a vertical sectional view schematically showing some components of a battery module according to still another embodiment of the present disclosure.

Referring to FIG. 5, unlike the cooling member 220 of FIG. 3 in which the upper frame 221 and the lower frame 226 are coupled using only an adhesive, the cooling member 220 of FIG. 5 may have a portion in which the upper frame 221 and the lower frame 226 are coupled to each other by mechanical joining. For example, as shown in FIG. 5, both side portions of the upper frame 221 and the lower frame 226 may be coupled to each other by riveting, which is a mechanical joining method. The riveting is a process of joining two members to each other by penetrating a rivet R through the upper frame 221 and the lower frame 226, respectively.

Figure 6:
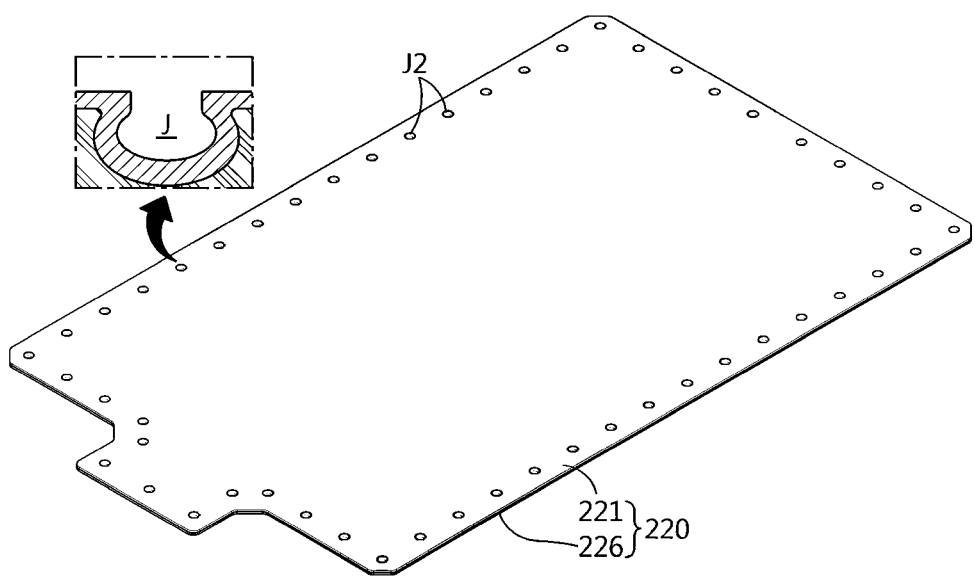
FIG. 6 is a perspective view schematically showing some components of a battery module according to still another embodiment of the present disclosure.

FIG. 6 is a perspective view schematically showing some components of a battery module according to still another embodiment of the present disclosure.

Referring to FIG. 6, both side portions of the upper frame 221 and the lower frame 226 may have a portion J2 in which the upper frame 221 and the lower frame 226 are coupled to each other using at least one of TOX clinching and clinching. As shown in FIG. 6, in the portion J2 the upper frame 221 and the lower frame 226 are joined to each other, a space J indented inward by TOX clinching or clinching may be formed.

For example, by the clinching, portions of the upper frame 221 and the lower frame 226 may be joined to each other in a state of overlapping with each other by applying a cold forming method. In addition, the TOX clinching is a process in which portions of the upper frame 221 and the lower frame 226 are plastically deformed in a state of overlapping with each other to be joined.

Therefore, according to this configuration of the present disclosure, since both side portions of the upper frame 221 and the lower frame 226 are coupled to each other using a mechanical joining method, the bonding force between the upper frame 221 and the lower frame 226 may be further enhanced. Accordingly, in the present disclosure, it is possible to further prevent the coolant from leaking through the gap between the upper frame 221 and the lower frame 226 due to a crack generated in the cooling member 220 when an external shock occurs while the battery module 200 is in use.

Figure 7:
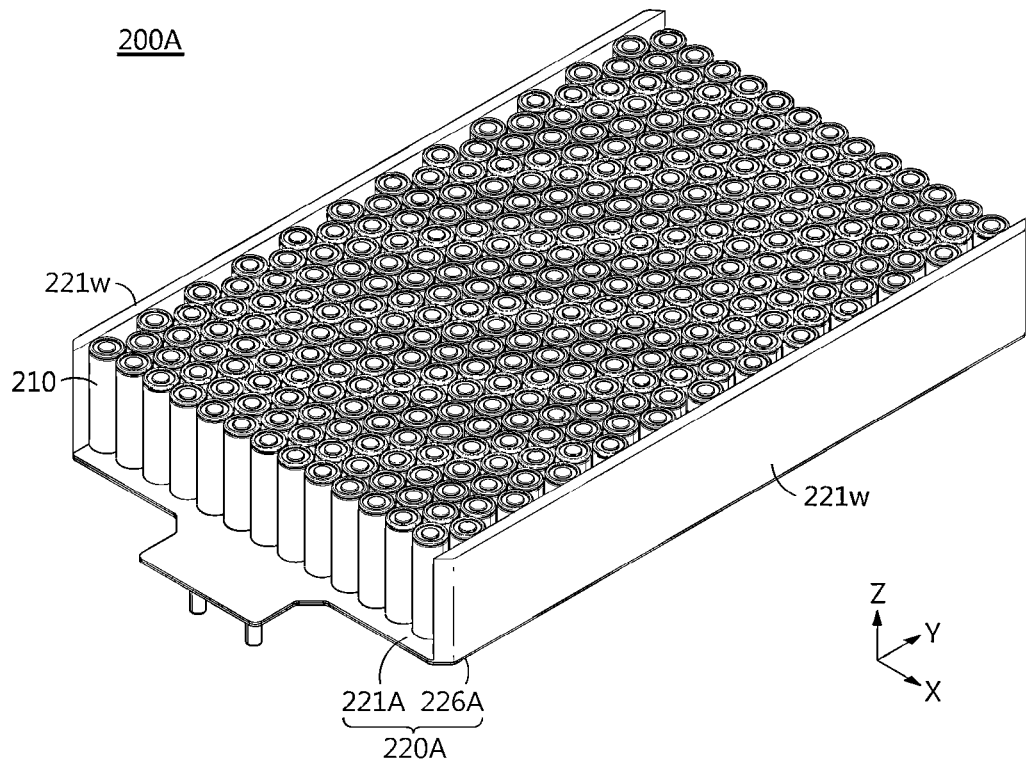
FIG. 7 is a perspective view schematically showing a battery module according still another embodiment of the present disclosure.

FIG. 7 is a perspective view schematically showing a battery module according still another embodiment of the present disclosure.

Referring to FIG. 7, a cooling member 220A of a battery module 200A of FIG. 7 may further include sidewalls 221w provided at both side ends of the upper frame 221, respectively. The sidewall 221w may have a shape extending upward from each of both side ends of the upper frame 221 having a plate shape. The sidewall 221w may be formed integrally with the upper frame 221. For example, as shown in FIG. 7, the upper frame 221 of the cooling member 220 of the present disclosure may include a left sidewall 221w and a right sidewall 221w respectively provided at left and right ends in the X direction. The sidewall 221w may have a shape elongating in a front and rear direction (Y-axis direction).

Therefore, according to this configuration of the present disclosure, since the sidewalls 221w respectively extending upward from both side ends of the upper frame 221 are further provided, it is possible to prevent the cooling member 220 from being bent in a vertical direction. That is, the sidewall 221w may serve as a reinforcing member for reinforcing the rigidity of the cooling member 220 to prevent the cooling member 220 from being bent due to the plurality of secondary batteries 210 mounted on the cooling member 220.

Figure 8:
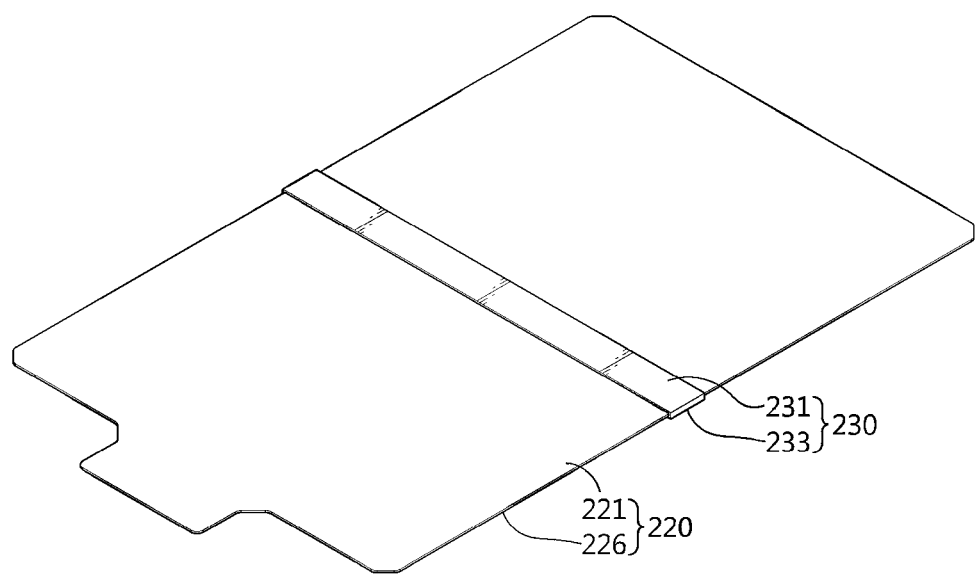
FIG. 8 is a perspective view schematically showing some components of a battery module according to still another embodiment of the present disclosure.

FIG. 8 is a perspective view schematically showing some components of a battery module according to still another embodiment of the present disclosure. Also, FIG. 9 is a vertical sectional view schematically showing some components of the battery module of FIG. 8.

Figure 9:
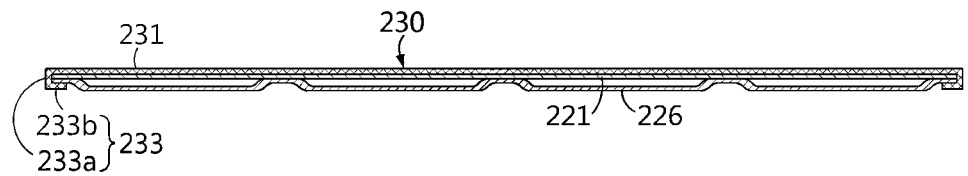
FIG. 9 is a vertical sectional view schematically showing some components of the battery module of FIG. 8.

Referring to FIGS. 8 and 9, the cooling member 220 of the battery module of FIG. 8 may further include a clip member 230. The clip member 230 may be configured to fix both side ends of the upper frame 221 and the lower frame 226 to each other. Specifically, the clip member 230 may include a body portion 231 and a fixing portion 233. The body portion 231 may elongate along one surface of the upper frame 221 and configured to be in close contact with one surface of the upper frame 221. The fixing portion 233 may be bent from the body portion 231 to surround both ends of the upper frame 221 and the lower frame 226.

For example, as shown in FIG. 9, the body portion 231 of the clip member 230 may have a shape elongating in a left and right direction (X-axis direction) along the upper surface of the upper frame 221. The body portion 231 may be in close contact with the upper surface of the upper frame 221 to limit deformation of the upper frame 221 so as to prevent the upper frame 221 from being bent.

For example, as shown in FIG. 9, the fixing portion 233 of the clip member 230 may include a first bent portion 233a and a second bent portion 233b to surround both ends of the upper frame 221 and the lower frame 226. The first bent portion 233a may be a portion bent downward from left and right ends the body portion 231. The second bent portion 233b may be a portion bent inward (toward the center) from a lower end of the first bent portion 233a.

Therefore, according to this configuration of the present disclosure, since the clip member 230 is further provided, the body portion 231 of the clip member 230 serves as a reinforcing member for reinforcing rigidity to prevent the cooling member 220 from being bent due to the plurality of secondary batteries 210 mounted on the cooling member 220.

Moreover, the fixing portion 233 of the clip member 230 may be bent to surround both side ends of the upper frame 221 and the lower frame 226, thereby preventing both side ends of the upper frame 221 and the lower frame 226 from being separated. Accordingly, in the present disclosure, by means of the clip member 230, it is possible to further prevent the coolant from leaking through the gap between the upper frame 221 and the lower frame 226 due to a crack generated at the cooling member 220 when an external shock occurs while the battery module 200 is in use.

Figure 10:
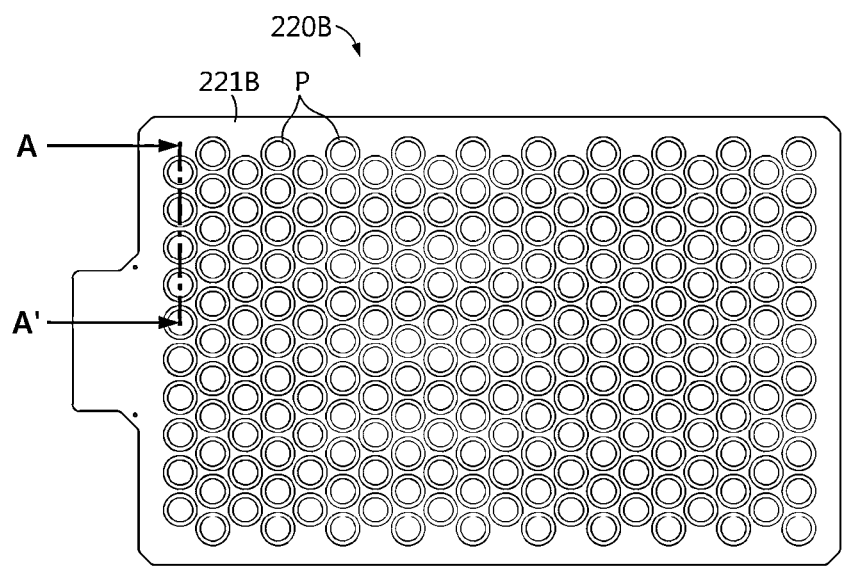
FIG. 10 is a plan view schematically showing some components of a battery module according to still another embodiment of the present disclosure.

FIG. 10 is a plan view schematically showing some components of a battery module according to still another embodiment of the present disclosure. Also, FIG. 11 is a horizontal sectional view schematically showing the battery module, taken along the line A-A' of FIG. 10.

Figure 11:
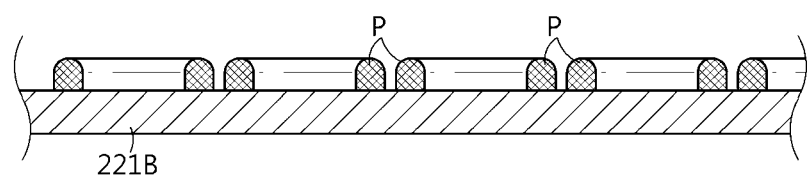
FIG. 11 is a horizontal sectional view schematically showing the battery module, taken along the line A-A' of FIG. 10.

Referring to FIGS. 10 and 11, a cooling member 220B of FIG. 10 may include a plurality of guide protrusions P provided at on the upper surface of the upper frame 221. The guide protrusions P may have a shape protruding from the upper surface of the upper frame 221 toward the secondary batteries 210 (in a positive direction of the Z-axis in FIG. 1) to guide mounting locations of the plurality of secondary batteries 210.

That is, the guide protrusion P may have a circular shape in a plane so as to surround the outer peripheral portion of the lower end of the secondary battery 210. In addition, one secondary battery 210 may be mounted inside the circular guide protrusion P.

Therefore, according to this configuration of the present disclosure, since the guide protrusion P is provided at the upper frame 221 of the cooling member 220B, the plurality of secondary batteries 210 may be easily disposed at correct locations, and the contact area between the upper frame 221 and the plurality of secondary batteries 210 may be increased, thereby effectively enhancing the cooling efficiency of the cooling member.

Meanwhile, a battery pack (not shown) according to an embodiment of the present disclosure includes at least one battery module 200. In addition, the battery pack may further include various devices (not shown) for controlling charging and discharging of the battery module 200, for example a battery management system (BMS), a current sensor, and a fuse.

Meanwhile, an electrical device (not shown) according to an embodiment of the present disclosure includes at least one battery module 200 described above. The electrical device may further include a device housing (not shown) having an accommodation space for accommodating the battery module 200, and a display unit through which a user may check the state of charge of the battery module 200.

In addition, the battery pack according to an embodiment of the present disclosure may be provided to a vehicle such as an electric vehicle or a hybrid electric vehicle. That is, the vehicle according to an embodiment of the present disclosure may be equipped with a battery pack including at least one battery module 200 according to an embodiment of the present disclosure described above, to be mounted in a vehicle body.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
| --- | --- |
| 200: battery module | 220: cooling member |
| 221, 226: upper frame, lower frame | |
| D: coolant channel | K: uneven structure |
| 210: secondary battery | |
| 221w: sidewall | 230: clip member |
| 231, 233: body portion, fixing portion | |
| P: guide protrusion | |

What is claimed is:

1. A battery module, comprising:
   a plurality of secondary batteries; and
   a cooling member configured with the plurality of secondary batteries mounted thereto,
   wherein the cooling member includes:
      an upper frame having a plate shape with a predetermined length with the plurality of secondary batteries mounted in direct contact with an upper surface of the upper frame; and
      a lower frame directly coupled to a lower surface of the upper frame on a side opposite the upper surface, the lower frame having an upper surface with an uneven structure to define a coolant channel configured so that a coolant flows through the coolant channel,
   wherein the uneven structure forms spaced apart portions between the lower frame and lower frame to define the coolant channel between the upper surface of the lower frame and the lower surface of the upper frame, and
   wherein the cooling member further includes a clip member configured to couple the upper frame and the lower frame to each other, the clip member including:
      a body portion directly contacting the upper surface of the upper frame and elongated along an entire width of the upper surface of the upper frame; and
      first and second fixing portions bent from respective ends of the body portion to surround respective sides of both the upper frame and the lower frame and a portion of a lower surface of the lower frame.

2. The battery module according to claim 1, wherein the uneven structure of the lower frame has a portion protruding toward the upper frame, and
   wherein the portion of the uneven structure protruding toward the upper frame is bonded to the lower surface of the upper frame.

3. The battery module according to claim 1, wherein both side portions of the upper frame and the lower frame are welded to each other.

4. The battery module according to claim 1, wherein both side portions of the upper frame and the lower frame are coupled to each other by mechanical joining.

5. The battery module according to claim 1, wherein the cooling member further includes sidewalls respectively provided at both side ends of the upper frame to extend upward from both side ends of the upper frame.

6. The battery module according to claim 1, wherein the upper frame includes a guide protrusion protruding toward the secondary batteries from the upper surface of the upper frame to guide mounting locations of the plurality of secondary batteries.

7. A battery pack, comprising at least one battery module as defined in claim 1.

8. An electrical device, comprising the battery pack as defined in claim 7.

9. The battery module according to claim 1, wherein the upper frame includes a metal material, and the lower frame includes a plastic material.

\* \* \* \* \*